US012577104B2

(12) United States Patent
Chatterjee et al.

(10) Patent No.: US 12,577,104 B2
(45) Date of Patent: Mar. 17, 2026

(54) CONCENTRATION OF SULFURIC ACID

(71) Applicant: DUPONT SAFETY & CONSTRUCTION, INC., Wilmington, DE (US)

(72) Inventors: Tirtha Chatterjee, Wilmington, DE (US); Steven Jons, Edina, MN (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 714 days.

(21) Appl. No.: 17/906,195

(22) PCT Filed: Mar. 15, 2021

(86) PCT No.: PCT/US2021/022303
§ 371 (c)(1),
(2) Date: Sep. 13, 2022

(87) PCT Pub. No.: WO2021/188408
PCT Pub. Date: Sep. 23, 2021

(65) Prior Publication Data
US 2023/0117014 A1      Apr. 20, 2023

Related U.S. Application Data

(60) Provisional application No. 62/990,293, filed on Mar. 16, 2020.

(51) Int. Cl.
C01B 17/88      (2006.01)
B01D 61/02      (2006.01)
B01D 61/08      (2006.01)

(52) U.S. Cl.
CPC ............ C01B 17/88 (2013.01); B01D 61/025 (2013.01); B01D 61/029 (2022.08); B01D 61/08 (2013.01);
(Continued)

(58) Field of Classification Search
CPC ....... C01B 17/88; C01B 17/90; B01D 61/025; B01D 61/029; B01D 61/08;
(Continued)

(56) References Cited

U.S. PATENT DOCUMENTS

| | | |
|---|---|---|
| 3,743,484 A | 7/1973 | Morimoto |
| 4,777,028 A | 10/1988 | Schrodter |

(Continued)

FOREIGN PATENT DOCUMENTS

| | | |
|---|---|---|
| CN | 1966400 A | 5/2007 |
| CN | 204170514 U | 2/2015 |

(Continued)

OTHER PUBLICATIONS

English language machine translation of JP 2012066240A, 25 pages, No Date.*

(Continued)

*Primary Examiner* — Pranav N Patel

(57)      ABSTRACT

A method for fractionating a sulfuric acid process stream having at least 1 wt % sulfuric acid, using a treatment system comprising three filtration assemblies each having membranes that are suitable to pass less than 10% salt in a standard test such that average passage of sulfuric acid from the first and third filtration assemblies is less than 30% and average passage of sulfuric acid from second filtration assembly is more than 70%. The system produces a fraction of the stream with a pH between 4 and 10, and a second fraction that contains at least 20 weight percent of sulfuric acid.

11 Claims, 6 Drawing Sheets

(52) U.S. Cl.
CPC .. *B01D 2313/243* (2013.01); *B01D 2317/022* (2013.01); *B01D 2317/04* (2013.01); *B01D 2317/06* (2013.01)

(58) Field of Classification Search
CPC ........ B01D 2313/243; B01D 2317/022; B01D 2317/04; B01D 2317/06; B01D 2311/12; B01D 2311/18; B01D 2317/025; B01D 61/02; B01D 61/12
See application file for complete search history.

(56) References Cited

U.S. PATENT DOCUMENTS

| | | | |
|---|---|---|---|
| 2004/0222157 A1 | 11/2004 | Minhas | |
| 2007/0272613 A1* | 11/2007 | Minhas | C10G 33/00 |
| | | | 210/651 |
| 2007/0272614 A1 | 11/2007 | Minhas et al. | |
| 2011/0036775 A1 | 2/2011 | Tarquin | |
| 2018/0162761 A1 | 6/2018 | Zhang et al. | |

FOREIGN PATENT DOCUMENTS

| | | | |
|---|---|---|---|
| CN | 105883729 A | 8/2016 | |
| CN | 207525016 U | 6/2018 | |
| CN | 109665661 A | 4/2019 | |
| DE | 2058525 A1 | 7/1971 | |
| DE | 3632623 A1 | 3/1988 | |
| DE | 102005031964 A1 | 1/2007 | |
| EP | 0232766 A2 | 8/1987 | |
| JP | 2012066240 A * | 4/2012 | |
| KR | 20180038945 A | 4/2018 | |
| WO | 0050341 A1 | 8/2000 | |
| WO | 2001074811 A2 | 9/2004 | |
| WO | WO-2010125897 A1 * | 11/2010 | ......... B01D 71/0281 |

OTHER PUBLICATIONS

English language machine translation of WO2010125898, 14 pages, No Date.*

Ricci, et al., "Assessment of nanofiltration and reverse osmosis potentialities to recover metals, sulfuric acid, and recycled water from acid gold mining effluent", Water Science & Technology, (2016), 367-374, vol. 74.2.

International Search Report and Written Opinion in International Application No. PCT/US2021/022303, issued Jun. 21, 2021.

Huang Dong, et al., "Chlorine containing waste sulfuric acid clean design and practice of the use of new technology", China Chlor-Alkali, No. 12 , 2012, pp. 10-12.

Sadoun, L et al., "Purification-concentration process. Studies on the transport mechanism of a chromium (VI)-sulfuric acid-tri-n-octylamine (TOA)-ammonium carbonate system", Salination, vol. 167, No. 1-3, 2004, pp. 159-163.

Zhang, et al., "Study on the Removal of Sulfate Ion the Weak Brine of Ion Exchange Membrane Electrolysis System with Nanofiltration Membrane Method", Journal of Inner Mongolia University of Technology (Natural Science), No. 03, 2011.

* cited by examiner

CONCENTRATION OF SULFURIC ACID

The term "hyperfiltration" encompasses both Reverse Osmosis (RO) and Nanofiltration (NF). RO membranes are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions-depending upon the species of divalent ion. NF membranes also typically reject particles in the nanometer range as well as organic molecules having molecular weights greater than approximately 200 to 500 Daltons.

The most common hyperfiltration membranes are made by interfacial polymerization.

Although there are variations, it can be noted that the most common approach involves forming a thin-film interfacially polymerized layer upon a porous support, typically a polysulfone or polyether sulfone with pore sizes between 0.001 and 0.5 μm. An aqueous polyfunctional amine is applied on the support surface and a non-polar solution (e.g. hexane, Isopar™, Freon™) containing polyfunctional amine-reactive monomers is applied thereon. Once brought into contact with one another, the polyfunctional amine-reactive and polyfunctional amine monomers react at the interface to form a polyamide layer or film. This layer, often referred to as a polyamide "discriminating layer" or "thin film layer," provides the composite membrane with its principal means for separating solute (e.g. salts) from solvent (e.g. aqueous feed).

A wide variety of monomers may be used at different concentrations and polymerization conditions. Polyfunctional amine monomers have at least two primary or secondary amino groups and may be aromatic (e.g., m-phenylenediamine, p-phenylenediamine, 1,3,5-triaminobenzene, 1,3,4-triaminobenzene, 3,5-diaminobenzoic acid, 2,4-diaminotoluene, and 2,4-diaminoanisole) or aliphatic (e.g., piperazine, ethylenediamine, propylenediamine, and tris (2-diaminoethyl) amine). Polyfunctional amine-reactive monomers include at least two and preferably two to four amine-reactive moieties selected from acyl halide, sulfonyl halide and anhydride. These monomer may be aromatic or aliphatic (straight chain or cyclic). Individual species may be used alone or in combination. Non-limiting examples of aromatic polyfunctional acyl halides include: trimesic acid chloride, terephthalic acid chloride, isophthalic acid chloride, biphenyl dicarboxylic acid chloride, napthalenetrisulfonyl chloride, and naphthalene dicarboxylic acid dichloride. Non-limiting examples of alicyclic polyfunctional acyl halides include: cyclopropane tri carboxylic acid chloride, cyclopentane tri carboxylic acid chloride, cyclohexane tri carboxylic acid chloride, cyclopentane dicarboxylic acid chloride, cyclobutane dicarboxylic acid chloride, cyclohexane dicarboxylic acid chloride, and tetrahydrofuran dicarboxylic acid chloride. Non-limiting examples of aliphatics include adipoyl chloride, malonyl chloride, glutaryl chloride, and sebacoyl chloride.

Various reactive and non-reactive additives may be present during the reaction that can influence performance properties: surfactants and phase transfer catalysts, co-solvents/solvents, organic molecules, inorganic salts, and nanoparticles. Similarly, the membrane may also be modified by different post-treatments after the reaction, including reactive and non-reactive polymer coatings, reaction to modify end-groups, plasma treatment, swelling agents, surfactants, and exposure to chlorine or mineral acids (e.g. hot phosphoric acid).

RO and NF membranes are typically operated at about pH>5. An important reason for this are the complexities of low pH operation that mostly precluded predictability. Interfacially polymerized membranes reject ions, both through charge and steric interactions. However, both mechanisms are dramatically impact at pH values at and lower than the membranes' isoelectric point. Carboxylic acids and amines are typically important end groups that influence rejection, but these become protonated at low pH, effectively making a "different" membrane. Membrane swelling and localized charge change with pH, affecting water and ion diffusion. Hydrogen sulfate ions $HSO_4^-$, the dominant form of sulfuric acid in water at pH<2, also varies in waters of hydration with concentration (impacting size). Finally, at high osmotic strengths present with more concentrated sulfuric acid, small difference in feed concentration can dominate performance. For these reasons, it has been problematic to develop a membrane process suitable to enable enrichment of sulfuric acid to high concentrations. B. C. Ricci et al., *Water Science & Technology*, (2016), 367-374, vol. 74.2, describe use of hyperfiltration membranes in the presence of sulfuric acid. However, this reference does not disclose a method capable of concentrating sulfuric acid to the extent claimed herein.

SUMMARY OF THE INVENTION

The present invention is directed to a method for fractionating a sulfuric acid process stream. The method comprises the following steps:

Providing a process stream (10) comprising at least 1 wt % sulfuric acid,

Providing a treatment system (12) comprising:

a) a first filtration assembly (20) comprising at least one hyperfiltration stage (100), said first filtration assembly (20) having a first feed inlet (22), a first reject outlet (24), and at least one first permeate outlet (26), b) a second filtration assembly (40) comprising at least one hyperfiltration stage (100), said second filtration assembly (40) having a second feed inlet (42), a second reject outlet (44), and at least one second permeate outlet (46), c) a third filtration assembly (60) comprising at least one hyperfiltration (100) stage, said third filtration assembly (60) having a third feed inlet (62), a third reject outlet (64), and at least one third permeate outlet (66), d) a first pump (80) having a first pump inlet (82) fluidly connected to said process stream (10) or to a junction point (18) which receives said process stream (10), and a first pump outlet (84) fluidly connected to the first feed inlet (22);

e) a second pump (86) having a second pump inlet (88) fluidly connected to said at least one first permeate outlet (26) and a second pump outlet (90) fluidly connected to said third feed inlet (62), and wherein each of said first, second, and third filtration assemblies (20, 40, 60) include modules having membranes that are suitable to pass less than 10% salt in a standard test (2000 ppm NaCl, pH 8, 30 gfd (51.02 lmh), 15% recovery), and wherein the treatment system is arranged such that f) a first feed stream (28) entering the first feed inlet (22) comprises the process stream (10), a second permeate stream (52) sourced from at least one second permeate outlet (46), and a third reject stream (70) sourced from the third reject outlet (64), g) a second feed stream (48) entering the second feed inlet (42) is fluidly connected to the first reject outlet (24), h) a third feed stream (68) entering the third feed inlet (62) is fluidly connected to at least one first permeate outlet (26); and Activating the first and second pumps (80, 86) to pressurize the first, second, and third feed streams (22, 42, 62) and to generate permeate from each of the first, second, and third filtration assemblies (20, 40 60), such that average passage of the sulfuric acid from the first and third filtration assemblies (20, 60) is less than 30% and the average passage of sulfuric acid from second filtration assembly (40) is more than 70%; and Producing a first fraction (14) of the process stream (10) that is in fluid communication with the third permeate outlet (66) and has a pH between 4 and 10, and a second fraction (16) of the process stream (10) that is in fluid communication with the second reject outlet (44) and contains at least 20 weight percent of sulfuric acid.

BRIEF DESCRIPTION OF THE DRAWINGS

Reverse osmosis (RO) and nanofiltration (NF) membranes are typically used in a spiral wound configuration. As illustrated in FIG. 1, conventional modules (150) include one or more membrane sheets (152), feed spacer sheets (154), and permeate spacer sheets (156) wound about a permeate collection tube (158). Glue lines (160) seal the permeate spacer sheet (156) to adjacent membrane sheets (152) around the three sides, forming the envelope and leaving an open end near the center where the permeate spacer sheet (156) is in fluid contact with the permeate collection tube (158). In operation, a pressurized flow of feed solution traverses the discriminating layer in an axial feed flow direction (162). A part (the permeate) of the feed solution passes through the membrane and spirals in a radially permeate flow (164) within the permeate spacer towards the permeate collection tube, where it exits the module.

As illustrated in FIG. 2, a plurality of spiral wound membrane modules (150) can be axially aligned in serial arrangement within the chamber of a cylindrical pressure vessel (170). From four to eight modules (150) are usually enclosed within the vessel (170), including a leading module (162) located adjacent the first vessel end (172) and a terminal module (164) located adjacent the opposing vessel end (174). Each vessel has a vessel feed port (176), a vessel reject port (178), and at least one vessel permeate port (180). In some embodiments, vessel permeate ports (180) exist on both ends of the vessel (172, 174). In still other embodiments, a vessel feed port (176) is in the center and a vessel reject ports (178) exist on both ends (172, 174). A stage (100) comprises a set of parallel vessels (170) having corresponding and fluidly connected vessel feed ports (176), vessel reject ports (178), and vessel permeate ports (180).

Filtration assemblies (120) comprise one or more hyperfiltration stages (100). Sequential stages (100', 100") within a filtration assembly (120) include an upstream stage (100') and a downstream stage (100"), and the reject stream (104') from the upstream stage (100') becomes the feed stream (102") of the downstream stage (100"). The same convention can be used to designate an upstream permeate stream (106') and a downstream permeate (106") of sequential stages (100', 100"). In preferred embodiments, the upstream stage (100') includes more parallel vessels (170) than a downstream stage (100") FIG. 2 illustrates this for a filtration assembly (120) comprising three stages (100) containing four, two, and one parallel pressure vessels (170). (The same three-stage configuration is illustrated in FIG. 3C.) The detailed filtration assemblies (120) in FIGS. 2 and 3 could correspond to any of the first, second, or third filtration assembly (20, 40, 60) in a treatment system (12), and the same convention of superscripts may be applied to upstream (#') and downstream (#") sequential components within. In the second filtration assembly (40), preferred embodiment may also include those with multiple hyperfiltration stages (100) connected in series, wherein the upstream stage (100') has the same number of parallel vessels (170) as the downstream stage (100"). This arrangement for the second filtration stage can be particularly advantageous when the downstream stage (100") is the last sequential hyperfiltration stage (110).

Figure 1:
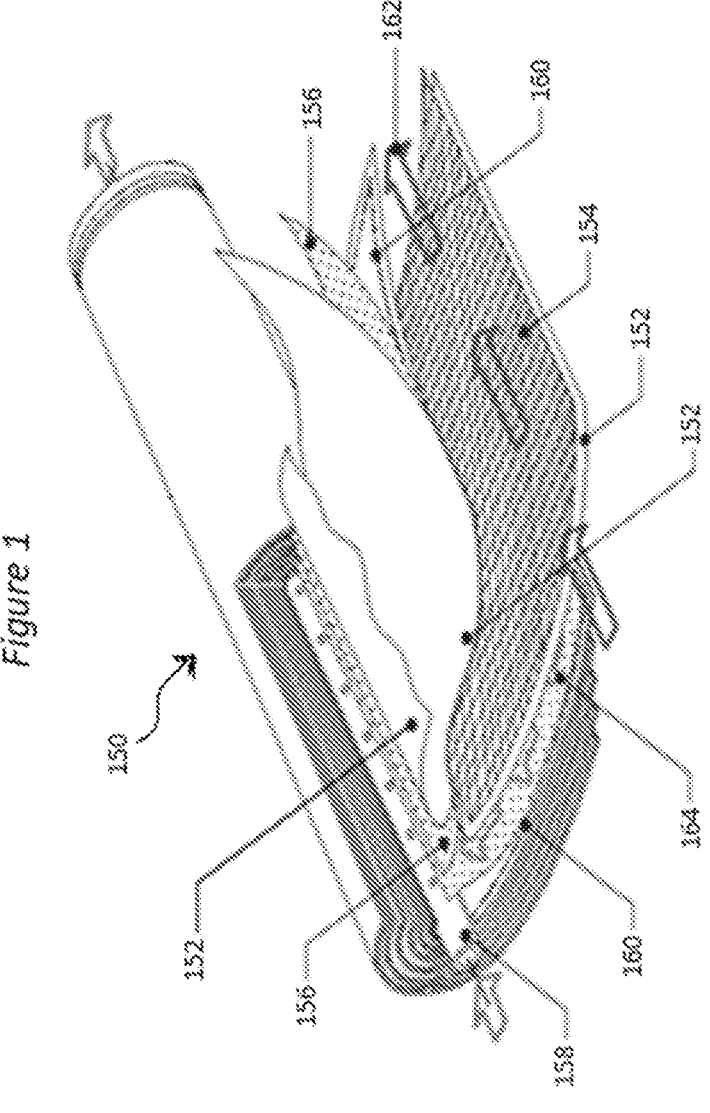
FIG. 1 depicts a typical spiral-wound module.
Figure 2:
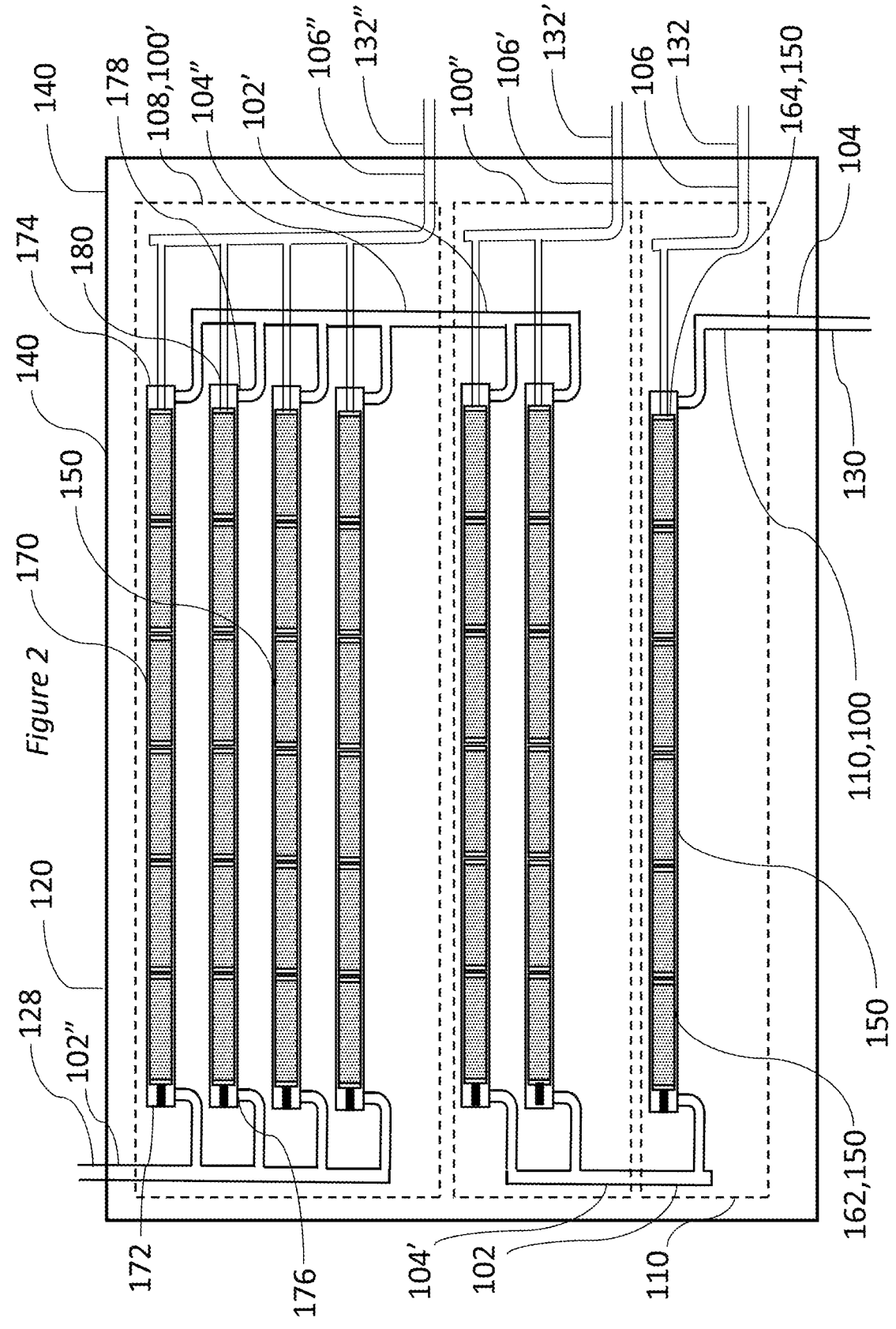
FIG. 2 depicts filtration assemblies comprising hyperfiltration stages.

Each filtration assembly (120) has a feed inlet (122), a reject outlet (124), and at least one permeate outlet (126), which correspond to the feed stream (128), reject stream (130), and at least one permeate stream (132). The feed stream (128) for the filtration assembly (120) becomes the feed stream (102) for the first sequential hyperfiltration stage (108). The reject stream (104) of the last sequential hyperfiltration stage (110) becomes the reject stream (130) of the filtration assembly (120). In operation, a pressurized feed stream (128) enters the filtration assembly (120). A portion of the filtration assembly's feed stream (128) passes through the membrane (152), producing one or more permeate streams (132) that exit the filtration assembly (120) at low pressure. The assembly's pressurized reject stream (130) makes up the difference between the feed streams (128) and combined permeate streams (132) of the filtration assembly (120).

Figure 3:
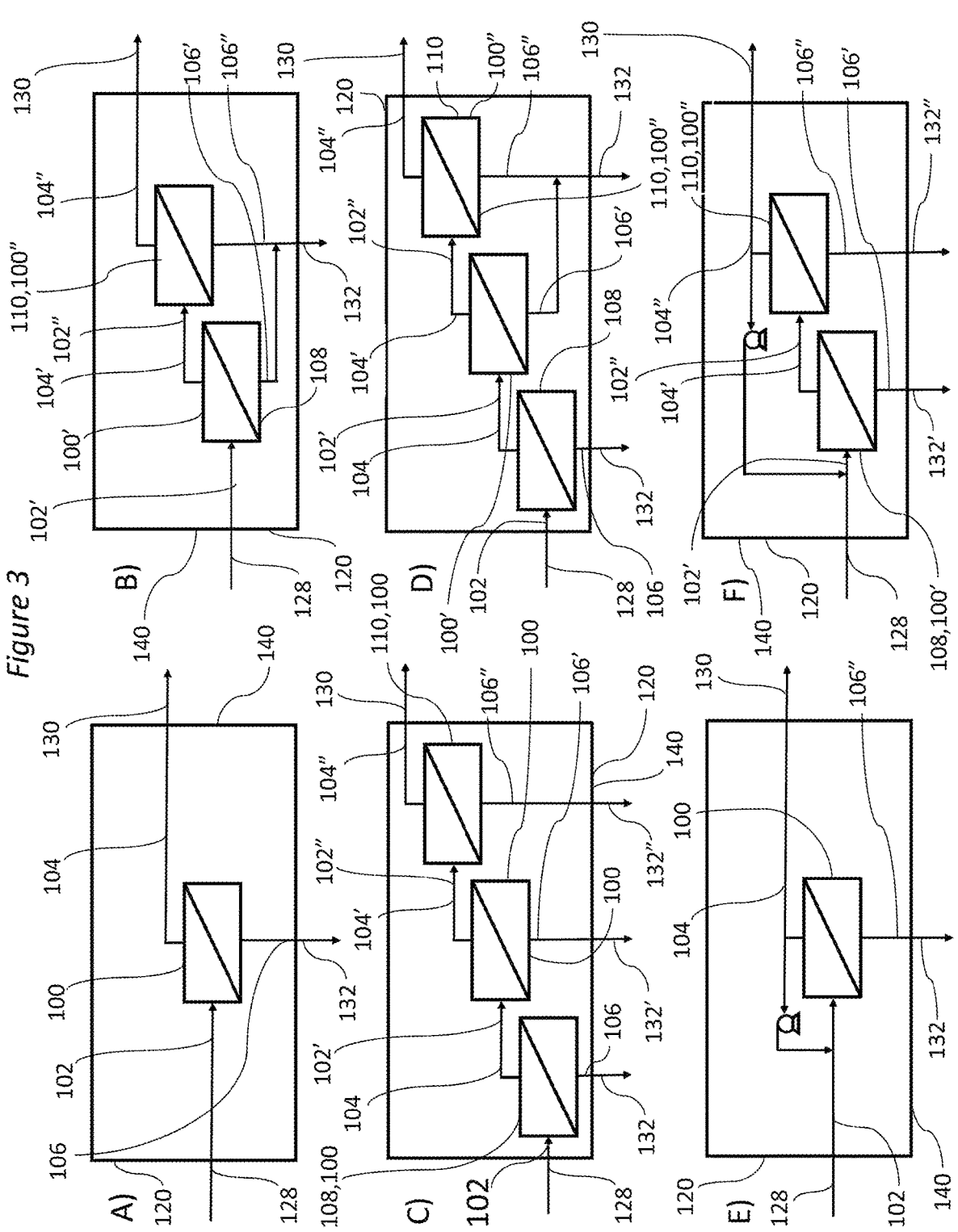
FIG. 3 depicts configurations of multiple filtration assemblies.

Many configurations for these filtration assemblies (120) are possible, and six are shown in FIG. 3. Each filtration assembly (120) correspond to potential configurations for three filtration assemblies (20, 40, 60) in FIGS. 4 and 5. FIG. 3A shows a simple filtration assembly (120) that consists of a single stage (100), having a feed stream (128), reject stream (130), and one permeate stream (132). The feed stream (102) for the first hyperfiltration stage (108) corresponds to the feed stream (128) for the filtration assembly (120). Similarly, the reject stream (104) for the last stage (110) corresponds to the reject stream (130) for filtration assembly (120). However, as illustrated in FIGS. 3B and 3D, a direct correspondence between stages (100) and permeate streams (132) for the filtration assembly (120) is not required.

A filtration assembly (120) may include recirculation loops within the assembly. As illustrated in FIGS. 3E and 3F, the reject stream (104) from one stage (100) within the filtration assembly (120) may be recirculated (after a booster pump) to the feed stream (102) of either the same or a previous (upstream) stage within the filtration assembly. In this case, the feed, reject, and permeate streams (128,130, 132) of the filtration assembly can still be identified as those leaving the box (140) drawn about the filtration assembly (120).

In this invention, each filtration assembly has specific purposes. The first filtration assembly (20) is for the purpose of removing sulfuric acid from a feed stream. The second filtration assembly (40) removes water from the reject stream (30) of the first filtration assembly (40) while providing partial removal of sulfuric acid. The third filtration assembly (60), like the first, also rejects sulfuric acid and returns it to the first filtration assembly (20). It is preferable that membranes and operating pressure be selected such that the average passage of the sulfuric acid from the first and third filtration assemblies (20, 60) is less than 50% and the average passage of sulfuric acid from second filtration assembly (40) is more than 50%. More preferably, the average passage of the sulfuric acid from the first and third filtration assemblies (20, 60) is less than 30% and the average passage of sulfuric acid from second filtration assembly (40) is more than 70%. Even more preferably, the average passage of the sulfuric acid from the first and third filtration assemblies (20, 60) is less than 25% and the average passage of sulfuric acid from second filtration assembly (40) is more than 75%. For these purposes, the average passage of sulfuric acid for a filtration assembly (120) is the concentration of sulfuric acid in combined permeate streams (132) divided by the concentration of sulfuric acid in the feed stream (128). For instance, even if permeate streams are not physically mixed in the treatment system (12), one can still calculate that two permeate streams of 7 L/min at 5 wt % and 3 L/min at 15 wt % would result in a combined permeate stream of 8 wt %. If a feed stream for the filtration assembly were 20%, this results in an average passage of 40% for the molecule. Depending on pH, sulfuric acid may be present in different forms ($H_2SO_4$, $H_3O^+HSO_4^-(H_3O^+)_2SO_4^{2-}$), but the term "sulfuric acid" is being used to refer to all. Despite desiring high passage of sulfuric acid in the second filtration assembly, suitable membranes were found to pass less than 10% salt in a standard test of the module, using a 2000 ppm NaCl feed at pH 8 and running at 30 gfd with 15% recovery. (The value of 30 gfd is 30 gallons/ft²/day or 51.02 Liter/m²/day.) More preferably, the module has a membrane suitable to pass less than 5% salt at those standard test conditions.

Membrane studies have identified membranes suitable for each filtration assembly, allowing the desired sulfuric acid concentration ranges to be obtained. For the first and third filtration assembly (20,60), an effective membrane was identified as one used in FilmTec's SW30HXR-440i Part #337649 module. For the second filtration (40), the best membrane identified is available in a FilmTec module TW30-1812-100 RO Membrane Part #170102. Another suitable membrane for the second filtration assembly (40) is one used in the FilmTec module XLE-440i Part #324657. Small spiral wound modules were built with these membranes using about four square feet of membrane, a 40-inch long, 0.75-inch diameter polysulfone permeate tube, a 28 mil diagonal-net feed spacer, and a 12 mil, 60 wale, Tricot-knit permeate spacer. The SWHXR-440i and XLE-440 modules could also be employed in conventional larger system after reinforcement of the permeate collection tube (e.g. using an internal metal tubular insert) to make it suitable for higher pressures (greater than 1250 psi). (The SWHXR-440i and XLE-440 are rated at 45° C. for 1200 psi and 600 psi, respectively.) Whether through reinforcement or thick permeate tube walls or through use of different polymers, it is preferred that modules (150) in the first and second filtration assembles contain permeate collection tubes suitable for operation at 45° C. without collapse at 1500 psi, more preferably at 2000 psi. When modules (150) are operated in a standard test (2000 ppm NaCl, pH 8, 30 gfd, 15% recovery), modules (150) comprising these membranes each had less than 5% passage of NaCl. However, we observed that membranes undergo dramatic changes at high concentrations of sulfuric acid, decreasing in water permeability more than a factor of five between 5% and 20% sulfuric acid. The observed permeability of sulfuric acid, predominantly present as $HSO_4^-$ between 5% and 20% sulfuric acid, is much greater than NaCl permeability at neutral pH.

Figure 4:
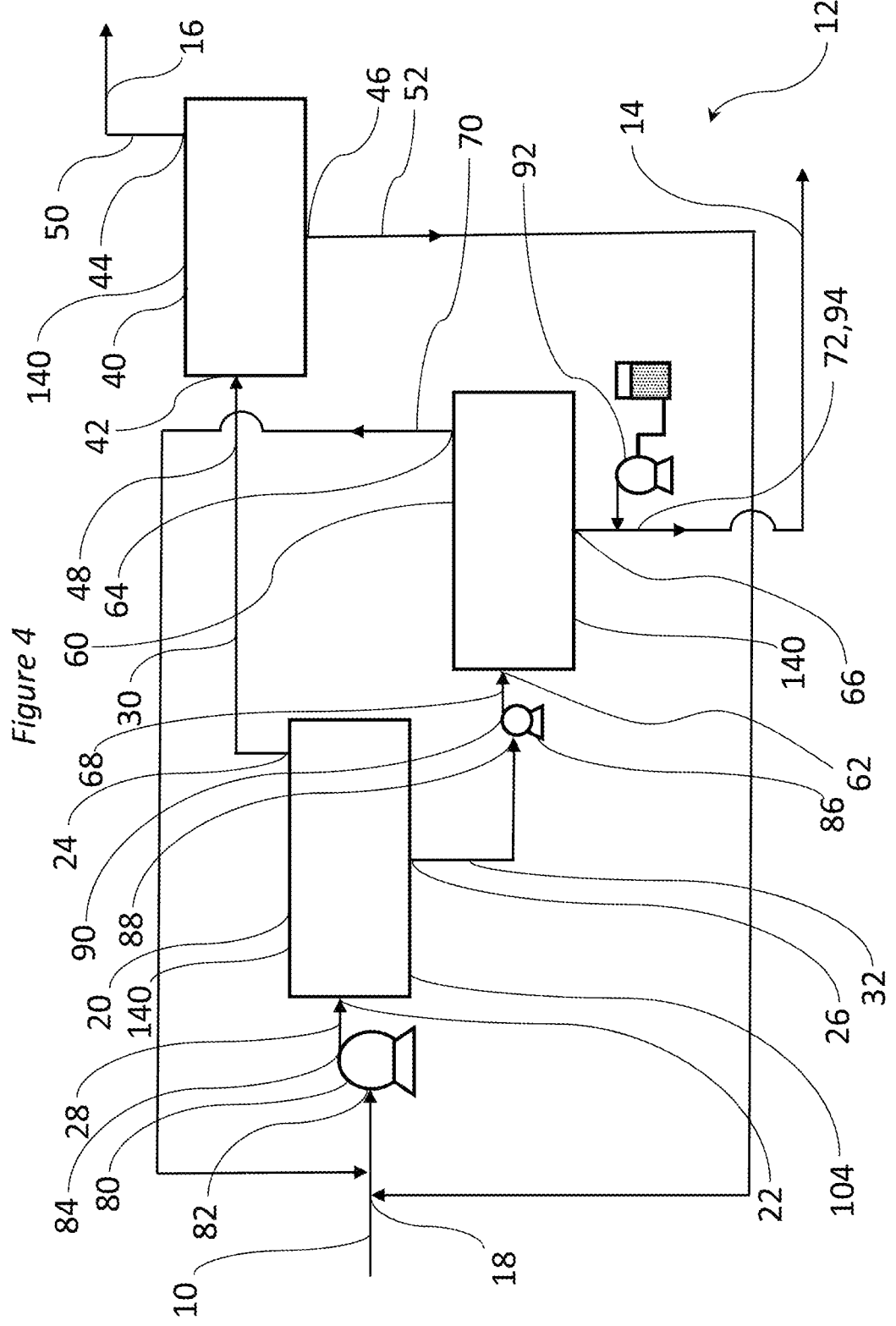
FIG. 4 depicts a treatment system that combines first, second and third filtration assemblies.
Figure 5:
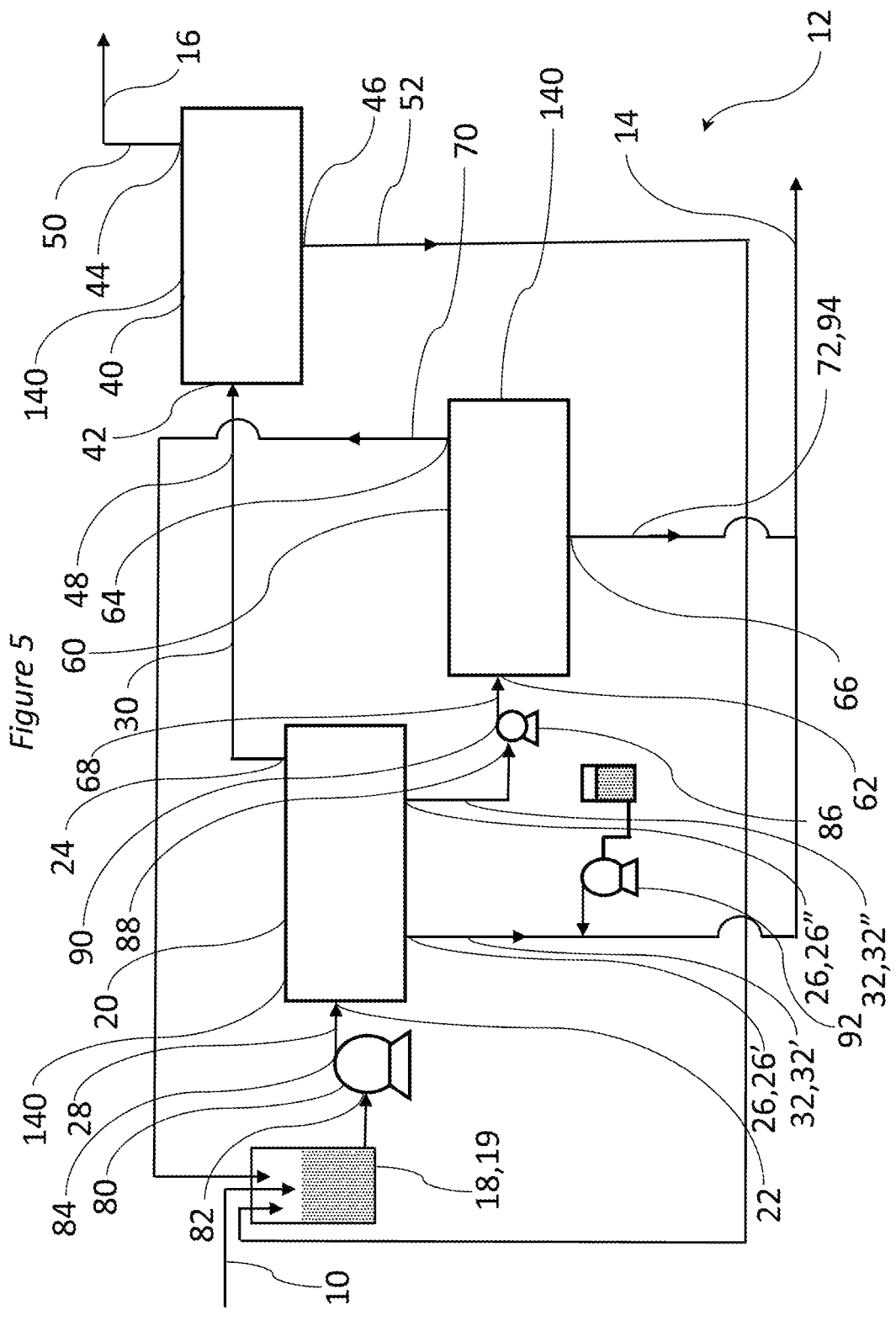
FIG. 5 depicts an alternate configuration of a treatment system.

FIGS. 4 and 5 show a treatment system that combines the first filtration assembly (20), second filtration assembly (40), and third filtration assembly (60). Each filtration assembly (20, 40, 60) has at least one hyperfiltration stage (100) that is not shown in these figures, a first feed inlet (22, 42, 62), a first reject outlet (24, 44, 64), and at least one first permeate outlet (26, 46, 66). The inlet (82) of a high-pressure pump (80) is fluidly connected to the process stream (10) or to a junction point (18) which receives said process stream (10) and other fluids. Such a junction point may be a tank (19), as illustrated in FIG. 5. The high-pressure pump (80) has an outlet (84) which is fluidly connected to the feed inlet (22) of the first filtration assembly (20). A second pump (86), which is not required to produce the same high pressure, has an inlet (88) fluidly connected to at least one permeate outlet (26) of the first filtration assembly (20). The second pump (86) has an outlet (90) fluidly connected to the feed inlet (62) of the third filtration assembly (60), so that enabling this pump pressurizes the feed stream (68) and generates permeate from the third filtration assembly (60).

The treatment system in FIGS. 4 and 5 uses defined sources for the feed to the three filtration assemblies (20, 40, 60). The feed stream (28) entering the first feed inlet (22) of the first filtration assembly (20) comprises the process stream (10), a permeate stream (52) sourced from at least one permeate outlet (46) of the second filtration assembly (40), and a reject stream (70) sourced from the third reject outlet (64). The feed stream (48) entering the feed inlet (42) of the second filtration assembly (40) is fluidly connected to the reject outlet (24) of the first filtration assembly (20). The feed stream (68) entering the inlet (62) of the third filtration assembly (60) is fluidly connected to at least one permeate outlet (26) from the first filtration assembly (20).

Both FIGS. 4 and 5 show a means (92) for base addition configured to add chemicals to a fluid stream (94). The means (92) for base addition be enabled to increases the pH of at least one fluid stream (94) associated with a permeate stream (32,72) from the first or third filtration assembly (20,60). In FIG. 4, the stream (94) is connected with the permeate outlet (86) for the third filtration assembly (60). In FIG. 5, the stream (94) is connected with permeate outlet (26) for the first filtration assembly (20), and that particular permeate outlet (26) is not one upstream of and in fluid communication with the feed inlet (62) to the third filtration assembly (60). In some embodiments, the stream (94) may be a portion of a permeate stream (26) from the first filtration assembly (20), and another portion of the permeate stream (26) goes to the feed inlet (62) of the third filtration assembly (60). In some embodiments, a means (92) for base addition may be to mechanically add solid NaOH pellets into an open stream or pond (e.g. by paddle, auger, shaker, belt). In an alternative embodiment a dissolved liquid (e.g. strong base or buffer) may be pumped into the stream. A resulting first fraction (14) of the process stream (10), that is in fluid communication with the third permeate outlet (66), preferably has a pH between 4 and 10, and more preferably the pH of the second discharge stream is between 5 and 9.

The applied pressure to the first filtration assembly (20) is produced with a high-pressure pump (80). Activating the high-pressure pump (80) generates permeate from the first and third filtration assemblies (20,60) by pressurizing their respective feed streams (22, 62). Suitable pumps for producing high pressure have an inlet (82) and outlet (84) and available from, for instance, LEWA or PFC Equipment. (For purposes of this application, it is recognized that the high-pressure pump (80) defined for this treatment system (12) may comprise assemblies of multiple parallel pumps having connected inlets (82) and outlets (84), as this is functionally equivalent.) The high-pressure pump receives and pressurizes at least the process stream (10). In some embodiments, the inlet (82) of the high-pressure pump receives a combined stream comprising the process stream (10) and permeate steams (52) from the second filtration assembly (40). In other embodiments, the high-pressure pump (80) receives the process stream (10) and permeate streams from the second filtration assembly (40) are pressurized by one or more other pumps.

In preferred embodiments, the first pump (8) pressurizes the first and second feed streams to more than 1250 psi, more preferably >1500 psi, or even >1600 psi. Because of the high pressures, a preferred hyperfiltration module (150) has a permeate tube (158) and permeate spacer (156) optimized for high pressure, and preferably the module comprises a permeate tube that does not collapse during operation at 2000 psi and 45° C. Also, a preferred permeate spacer is a knitted material with more than 50 wales (counts per inch) across. In preferred embodiments, the third filtration assembly (60) uses lower applied pressure than the first filtration assembly (20).

In some embodiments, the treatment method is performed with the feed stream (48) to the first and/or second filtration assemblies (20,40) at a temperature that is less than 15° C. Since osmotic pressure increases with temperature, this can reduce the required pressure applied by the high pressure pump (80). Lower temperature can decrease the passage of membrane in the first filtration assembly (20), which can be an advantage. Lower temperature can also increase the module lifetime, as membrane hydrolysis is reduced.

The process stream (10) fed to the treatment system (12) comprises at least 1 wt % sulfuric acid, and more preferably at least 5 wt % or 7 wt % or 10 wt % sulfuric acid. The treatment method (12) results in fractionating this process stream (10) into a first fraction (14) having less sulfuric acid and a second fraction (16) containing more. The first fraction (16) is in fluid communication with the reject outlet (44) of the second filtration assembly (40) and preferably contains at least 20 wt % sulfuric acid, more preferably at least 24 wt % sulfuric acid or even at least 25 wt % sulfuric acid.

EXAMPLE 1

Figure 6:
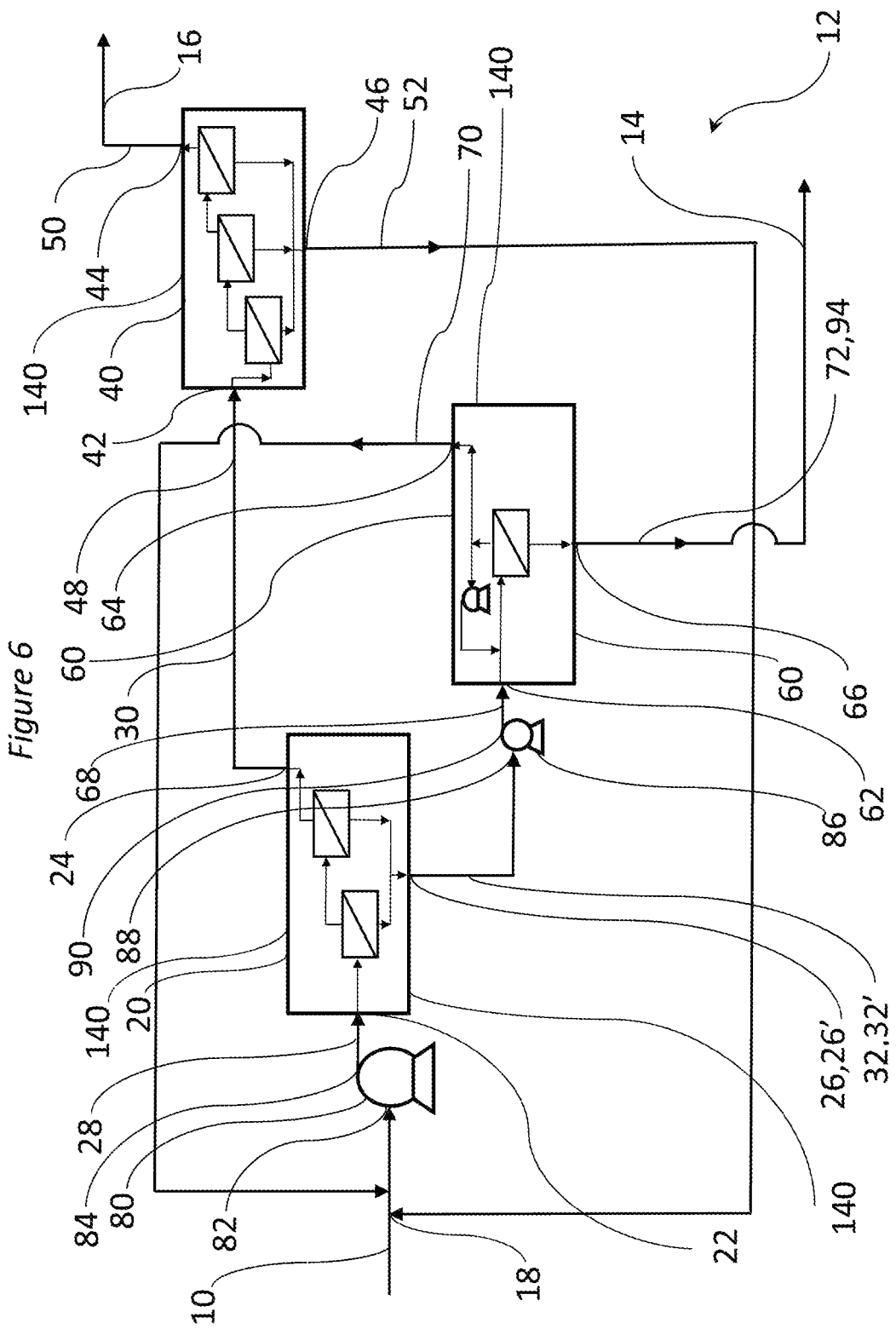
FIG. 6 depicts a system having operating conditions favorable to concentrate sulfuric acid.

Performance data were obtained with small modules containing 4 square feet of membrane active area, as described previously. FIG. 6 provides an example of a system having operating conditions favorable to concentrate sulfuric acid. The results from the small-module membrane were used to simulate a system with membrane modules

8

(150) of a more conventional 440 square foot size. The first filtration assembly (20) is a two-stage assembly consistent with FIG. 3B, with the first stage having 9 vessel and the second stage having six vessels (each vessel has six modules). All vessels use modules consistent with FilmTec's SW30HXR-440i, but having pressure re-enforcement of the permeate tube. The second filtration assembly (40) is shown as a three-stage assembly similar to the configuration in FIG. 3C, but having a combined permeate stream. This filtration assembly uses 5, 3, and 3 vessels, respectively, in sequential stages. Each vessel has eight modules containing 440-square of membrane, using the membrane of TW30-1812-100 RO Membrane Part #170102. The third filtration assembly (60) has a single stage with partial recycle of the reject stream, as shown in FIG. 3E. In this case, 900 psi is applied to the feed and a recirculation pump sends 80% of the of the reject stream back to the feed (and first module). This filtration assembly uses six parallel vessels of six modules, the same 440 ft$^2$ modules as the first stage. Using an initial process stream of 152,000 GPD and 8.5% sulfuric acid, Table 1 shows the resulting concentration of different streams (as in FIG. 6) in the process, resulting in a first fraction 103000 GPD and 0.64% sulfuric acid and a second fraction of 49000 GPD and 25.0% sulfuric acid.

TABLE 1

| Stream | Description | Flow (gpd) | Sulfuric acid |
|---|---|---|---|
| 10 | Process stream | 152000 | 8.5% |
| 14 (same as 72) | First fraction | 103000 | 0.64% |
| 16 (same as 50) | Second fraction | 49000 | 25.0% |
| 28 | Feed stream into first assembly | 290000 | 10.5% |
| 30 | Reject stream from first assembly | 169000 | 16.6% |
| 32 (same as 68) | Permeate stream from first assembly | 121000 | 2.1% |
| 48 (same as 30) | Feed stream to second assembly | 169000 | 16.6% |
| 50 (same as 16) | Reject stream from second assembly | 49000 | 25.0% |
| 52 | Permeate stream from second assembly | 120000 | 13.2% |
| 68 (same as 32) | Feed stream to third assembly | 121000 | 2.1% |
| 70 | Reject stream from third assembly | 18000 | 10.3% |
| 72 (same as 14) | Permeate stream from third assembly | 103000 | 0.64% |

The invention claimed is:

1. A method for fractionating a sulfuric acid process stream comprising:

providing a process stream (10) comprising at least 1 wt % sulfuric acid, providing a treatment system (12) comprising:

a) a first filtration assembly (20) comprising at least one hyperfiltration stage (100), said first filtration assembly (20) having a first feed inlet (22), a first reject outlet (24), and at least one first permeate outlet (26), b) a second filtration assembly (40) comprising at least one hyperfiltration stage (100), said second filtration assembly (40) having a second feed inlet (42), a second reject outlet (44), and at least one second permeate outlet (46), c) a third filtration assembly (60) comprising at least one hyperfiltration (100) stage, said third filtration assembly (60) having a third feed inlet (62), a third reject outlet (64), and at least one third permeate outlet (66), d) a first pump (80) having a first pump inlet (82) fluidly connected to said process stream (10) or to a junction point (18) which receives said process stream (10), and a first pump outlet (84) fluidly connected to the first feed inlet (22);

e) a second pump (86) having a second pump inlet (88) fluidly connected to said at least one first permeate outlet (26) and a second pump outlet (90) fluidly connected to said third feed inlet (62), and wherein each of said first, second, and third filtration assemblies (20, 40, 60) include modules having membranes that are suitable to pass less than 10% salt in a standard test (2000 ppm NaCl, pH 8, 30 gfd (51.02 lmh), 15% recovery), and wherein the treatment system is arranged such that f) a first feed stream (28) entering the first feed inlet (22) comprises the process stream (10), a second permeate stream (52) sourced from the at least one second permeate outlet (46), and a third reject stream (70) sourced from the third reject outlet (64), g) a second feed stream (48) entering the second feed inlet (42) is fluidly connected to the first reject outlet (24), h) a third feed stream (68) entering the third feed inlet (62) is fluidly connected to the at least one first permeate outlet (26); and activating the first and second pumps (80, 86) to pressurize the first, second, and third feed streams (22, 42, 62) and to generate permeate from each of the first, second, and third filtration assemblies (20, 40 60), such that average passage of the sulfuric acid from the first and third filtration assemblies (20, 60) is less than 30% and the average passage of sulfuric acid from the second filtration assembly (40) is more than 70%; and producing a first fraction (14) of the process stream (10) that is in fluid communication with the at least one third permeate outlet (66) and has a pH between 4 and 10, and a second fraction (16) of the process stream (10) that is in fluid communication with the second reject outlet (44) and contains at least 20 weight percent of sulfuric acid.

2. The method of claim 1, wherein the average passage of the sulfuric acid from the first and third filtration assemblies (20, 60) is less than 25% and the average passage of sulfuric acid from second filtration assembly (40) is more than 75%.

3. The method of claim 1, wherein the process stream (10) comprises at least 7 wt % sulfuric acid.

4. The method of claim 1, wherein the first filtration assembly (20) comprises multiple hyperfiltration stages (100) connected in series, including one or more adjacent stages (100',100"), an upstream stage (100') and a downstream stage (100"), wherein the upstream stage (100') has a greater number of parallel vessels (170) than the downstream stage (100").

5. The method of claim 4, wherein the at least one first permeate outlet (26) includes an upstream permeate outlet (26') in fluid communication with both an upstream stage (100') and the first fraction (14) of the process stream (10) and a downstream first permeate outlet (26") in fluid communication with both a downstream stage (100") and the third feed inlet (62).

6. The method of claim 1, wherein the second feed stream (48) has a temperature that is less than 15° C.

7. The method of claim 1, wherein the first pump (80) pressurizes the first and second feed streams to more than 1250 psi, and modules (150) in the first and second filtration assemblies contain permeate tubes suitable for operation without collapse at 2000 psi and 45° C.

8. The method of claim 1, wherein the second fraction (16) contains at least 25 wt % of sulfuric acid.

9. The method of claim 1, wherein the second filtration assembly (40) comprises multiple hyperfiltration stages (100) connected in series, including one or more adjacent stages (100',100"), an upstream stage (100') and a downstream stage (100"), wherein the upstream stage (100') has the same number of parallel vessels (170) as the downstream stage (100").

10. The method of claim 1, wherein the first pump (8) pressurizes the first and second feed streams to more than 1500 psi.

11. The method of claim 1, wherein the treatment system (12) further comprises a base addition means (92) configured to add chemicals to a fluid stream (94); and wherein the base addition means (92) enables to increase the pH of the fluid stream (94) in fluid communication with the at least one third permeate outlet (66) or the at least one first permeate outlet (26) that is not upstream of and in fluid communication with the third feed inlet (62).

\* \* \* \* \*